(12) United States Patent
Ueda

(10) Patent No.: US 10,178,362 B2
(45) Date of Patent: Jan. 8, 2019

(54) NON-TRANSITORY COMPUTER-READABLE MEDIUM, HOST DEVICE, AND ARRAY DETERMINATION METHOD

(71) Applicant: Roland DG Corporation, Hamamatsu-shi, Shizuoka (JP)

(72) Inventor: Jun Ueda, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 0 days.

(21) Appl. No.: 15/869,756

(22) Filed: Jan. 12, 2018

(65) Prior Publication Data

US 2018/0205917 A1    Jul. 19, 2018

(30) Foreign Application Priority Data

Jan. 18, 2017  (JP) ................................ 2017-007053

(51) Int. Cl.
*H04N 9/31* (2006.01)
*H04N 13/388* (2018.01)

(52) U.S. Cl.
CPC ........... *H04N 9/3105* (2013.01); *H04N 9/312* (2013.01); *H04N 9/3129* (2013.01); *H04N 13/388* (2018.05)

(58) Field of Classification Search
None
See application file for complete search history.

(56) References Cited

U.S. PATENT DOCUMENTS

| | | | |
|---|---|---|---|
| 2011/0182560 A1* | 7/2011 | Kambhatla | H04L 65/4069 386/200 |
| 2015/0019000 A1 | 1/2015 | Nakamura | |
| 2015/0287169 A1 | 10/2015 | Ueda et al. | |

FOREIGN PATENT DOCUMENTS

| | | |
|---|---|---|
| JP | 04-113828 A | 4/1992 |
| JP | 2015-016610 A | 1/2015 |
| JP | 2015-201760 A | 11/2015 |

* cited by examiner

*Primary Examiner* — Nicholas R Wilson
(74) *Attorney, Agent, or Firm* — Keating & Bennett, LLP

(57) ABSTRACT

A host device supplying, via a hub, different picture signals to projectors connected to ports, respectively, of the hub, executes a correlation process to obtain port numbers of the ports, respectively, and serial numbers of the projectors, with the port numbers correlated with the serial numbers; an enumeration process to enumerate display devices, respectively, to obtain display device information of each of the display devices, and to obtain the serial numbers of the projectors in accordance with an order in which the display devices were enumerated; and an array generation process to collate the serial numbers obtained by the correlation process to the serial numbers obtained by the enumeration process to store, in array elements, the display device information in an order identical to an order of the collated serial numbers, based on a numerical order of the port numbers obtained by the correlation process.

4 Claims, 6 Drawing Sheets

| VALUES OF PORT NUMBER | 1 | 3 |
|---|---|---|
| VALUES OF SERIAL NUMBER | 0123456789ABCDEF | 0987654321FEDCBA |

FIG. 6

| INDEX VALUE (ORDER OF ENUMERATION) | 0 | 1 |
|---|---|---|
| VALUES OF DISPLAY DEVICE INFORMATION | AAAAAA | BBBBBB |
| VALUES OF SERIAL NUMBER | 0123456789ABCDEF | 0987654321FEDCBA |

FIG. 7

| INDEX VALUE (ORDER OF ENUMERATION) | 0 | 1 |
|---|---|---|
| VALUES OF DISPLAY DEVICE INFORMATION | BBBBBB | AAAAAA |
| VALUES OF SERIAL NUMBER | 0987654321FEDCBA | 0123456789ABCDEF |

FIG. 8

Array[ ] = {AAAAAA, BBBBBB}

FIG. 9

NON-TRANSITORY COMPUTER-READABLE MEDIUM, HOST DEVICE, AND ARRAY DETERMINATION METHOD

CROSS REFERENCE TO RELATED APPLICATIONS

This application claims the benefit of priority to Japanese Patent Application No. 2017-007053 filed on Jan. 18, 2017. The entire contents of this application are hereby incorporated herein by reference.

BACKGROUND OF THE INVENTION

1. Field of the Invention

The present invention relates to non-transitory computer-readable mediums, host devices, and array determination methods.

2. Description of the Related Art

Modeling machines for producing three-dimensional objects by exposing a photocurable resin to light are known (see, JP-A-4-113828, JP-A-2015-16610, and JP-A-2015-201760).

JP-A-4-113828 discloses modeling machines including two laser scanner devices that are positioned above the photocurable resin contained in a resin vat. In such machines, each laser scanner device is used to move the laser spot in a two-dimensional plane, i.e., on the surface of the photocurable resin. Consequently, an exposed portion of the photocurable resin is cured, which results in the creation of a modeled object.

JP-A-2015-16610 and JP-A-2015-201760 disclose modeling machines including two projectors that are positioned beneath the photocurable resin contained in the resin vat. The two projectors are provided with different picture signals from a computer. Further, the pictures based on these picture signals are projected on the photocurable resin by the two projectors. Consequently, an exposed portion of the photocurable resin is cured, which results in the creation of a modeled object.

With two projectors of a modeling machine connected to a hub, such as a USB hub, the computer automatically recognizes the two projectors in the order of their connection using the "plug and play" function when the hub is connected to the computer initially. Since a hub is used, the order in which the two projectors are recognized is indeterminate. Therefore, no one can predict which projector will be recognized first.

However, an array is declared in the control program of these two projectors to allow a computer to discriminate and control the two projectors. The display device information associated with each projector is stored in an element of the array. This display device information is obtained using the computer's operating system through an enumeration process. When the enumeration process is executed by the computer, the pieces of display device information for the two projectors are enumerated in the order in which the projectors were recognized using an initial plug and play process. If these pieces of display device information are stored in elements of an array in an order identical to the order of recognition, the display device information for the projector that was recognized first is stored in the first element of the array, whereas the display device information for the projector that was recognized subsequently is stored in the second element of the array. However, as described above, since the order of enumeration, i.e., the order in which the two projectors are recognized, is indeterminate, the display device information for the projector that should be stored in the second element of the array may be stored in the first one. In such situations, the positions of the pictures that are projected by the projectors are reversed. Therefore, the picture signal that is to be supplied to one projector may be supplied to the other one instead.

SUMMARY OF THE INVENTION

In view of the above-described circumstances, preferred embodiments of the present invention prevent a computer from supplying picture signals incorrectly to two projectors or projection displays.

One preferred embodiment of the present invention provides a non-transitory computer-readable medium storing a program that causes a computer to execute the following processes, the computer supplying, via a hub, different picture signals to first and second displays connected to first and second downstream ports, respectively, of the hub: a correlation process to obtain, for each of first and second display devices, port numbers of ports connected to the first and second displays and serial numbers of the first and second displays, with the port numbers correlated with the serial numbers, each of the first and second display devices being an abstract or virtual version of the first and second displays, respectively; an enumeration process to enumerate the first and the second display devices, to obtain display device information of each of the first and second display devices in accordance with an order in which the first and second display devices were enumerated, and to obtain the serial numbers of the first and second displays in accordance with the order in which the first and second display devices were enumerated; and an array generation process to collate the serial numbers obtained by the correlation process to the serial numbers obtained by the enumeration process and to store, in array elements, the display device information in an order identical to an order of the collated serial numbers, based on a numerical order of the port numbers obtained by the correlation process.

According to preferred embodiments of the present invention, a picture signal that should be supplied to the first display is correctly supplied to the first display without fail, and a picture signal that should be supplied to the second display is correctly supplied to the second display without fail.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6 is a table illustrating port numbers and serial numbers which are correlated with each other.

FIG. 7 is a diagrammatic representation of display device information of enumerated display devices and serial numbers.

FIG. 8 is a diagrammatic representation of display device information of enumerated display devices and serial numbers.

FIG. 9 shows an example of an array.

DETAILED DESCRIPTION OF THE PREFERRED EMBODIMENTS

Figure 1:
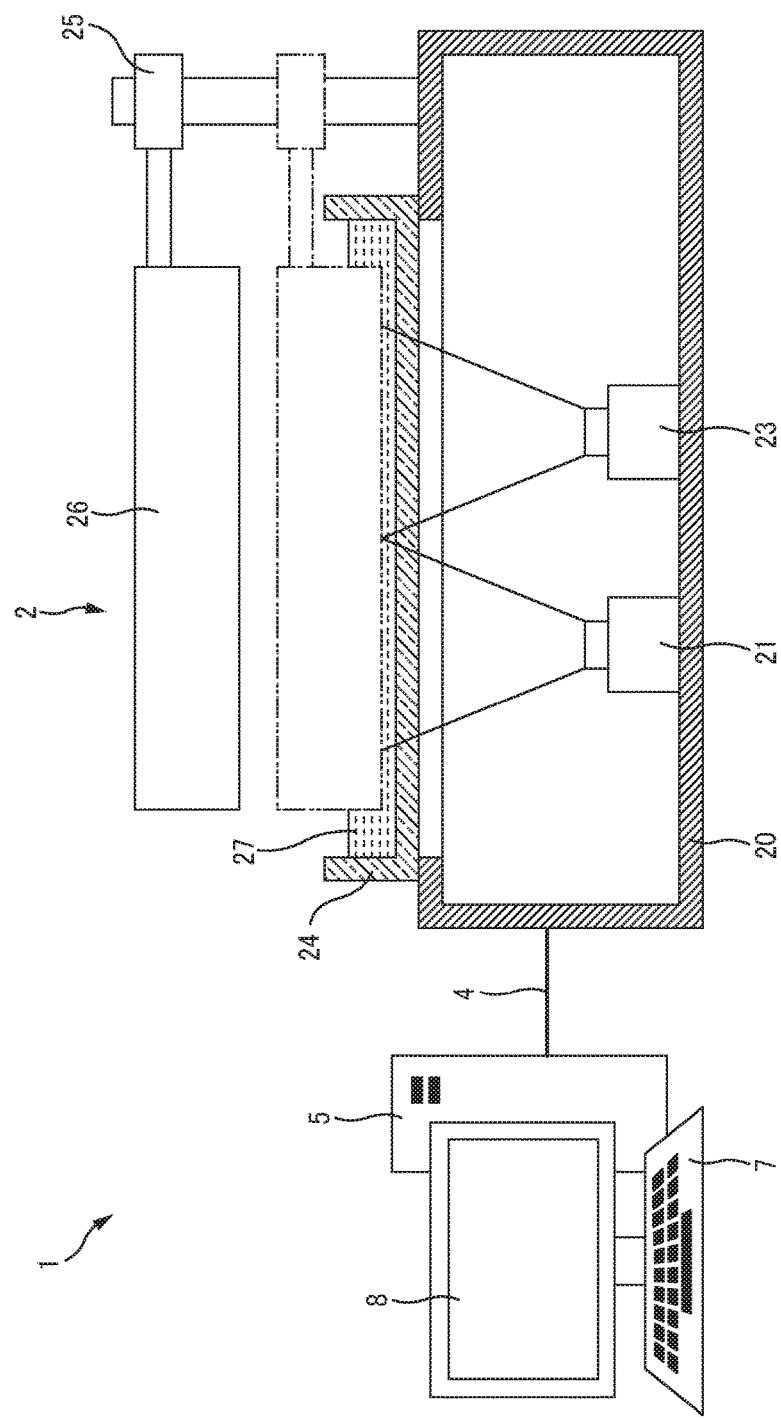
FIG. 1 is a configuration diagram of a modeling system including a modeling machine which is illustrated in cross-section and a host device.

Referring to the drawings, preferred embodiments of the present invention are described. These preferred embodiments described below are, however, provided with technically preferable various elements and features to implement the present invention. Therefore, the scope of the present invention is not limited to the following preferred embodiments and illustrative examples.

FIG. 1 is a schematic view of a modeling system 1. As shown in FIG. 1, the modeling system 1 includes a modeling machine 2 and a host device 5. The modeling machine 2 and the host device 5 are connected to each other via a USB cable 4 that complies with the Universal Serial Bus (USB) standard and communicate with each other in accordance with the USB specification. The host device 5 is on the host side (parent) in their USB communications and the modeling machine 2 is on the device side (child) in their USB communications. In particular, the modeling machine 2 is a hub-connected compound device.

Figure 2:
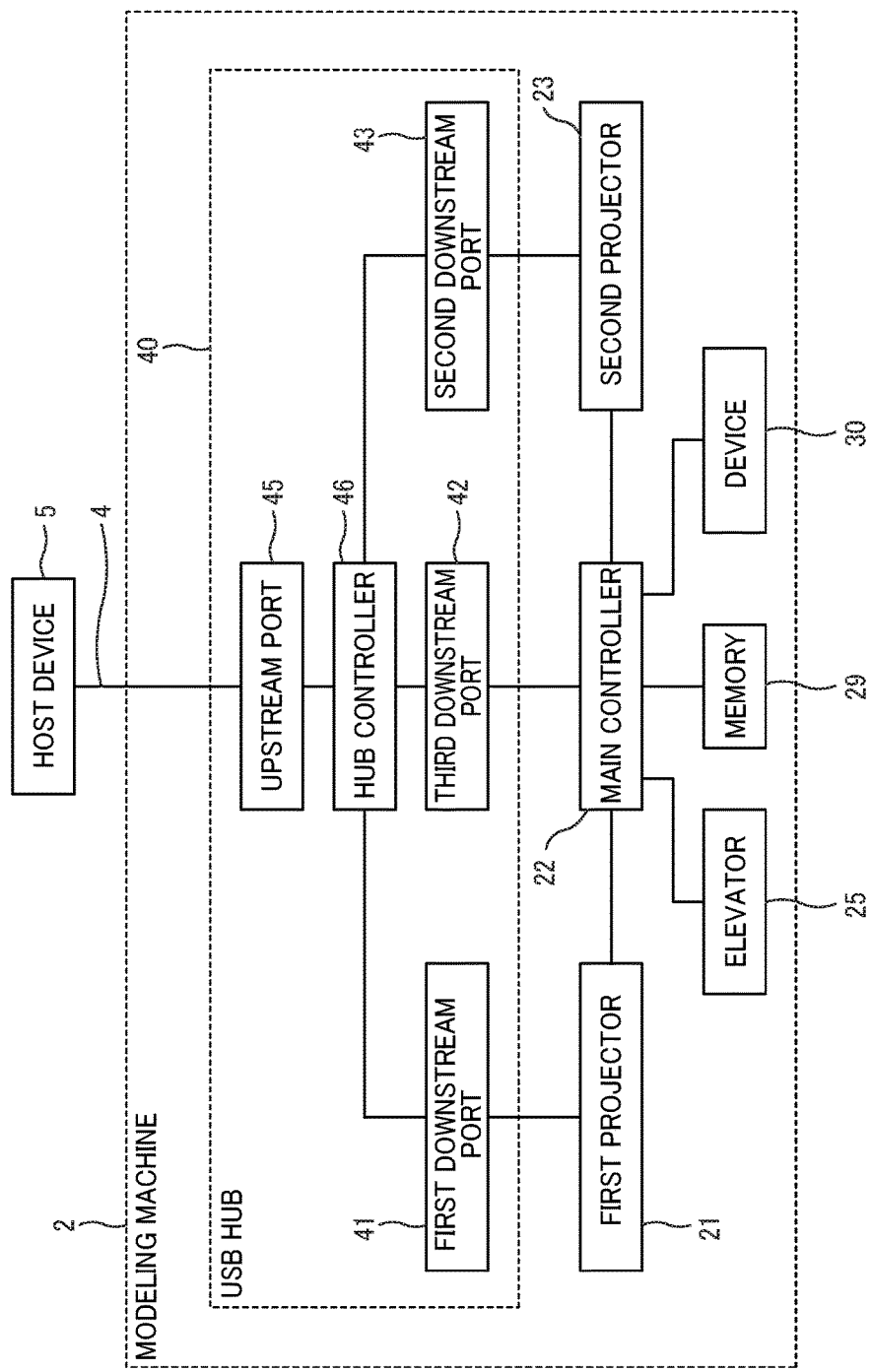
FIG. 2 is a block diagram of the modeling machine.

The modeling machine 2 creates, by successively producing and building two-dimensional slice modeled objects, a three-dimensional modeled object which is a laminate of the slice modeled objects. Referring to FIGS. 1 and 2, the modeling machine 2 is described in detail. FIG. 2 is a block diagram of the modeling machine 2.

As shown in FIG. 1, the modeling machine 2 includes a housing 20, a first projector 21, a second projector 23, a resin vat 24, an elevator 25, and a holder 26. Furthermore, as shown in FIG. 2, the modeling machine 2 includes a main controller 22, a memory 29, a device 30, and a USB hub 40.

As shown in FIG. 1, the housing 20 preferably has a hollow box shape. A top plate of the housing 20 is made of a material that is transparent to light or an opening is formed in the top plate of the housing 20. The resin vat 24 is disposed on the top plate of the housing 20. An upper surface of the resin vat 24 is opened and at least a bottom plate of the resin vat 24 is made of a material that is transparent to light (transparent material). The resin vat 24 contains a photocurable resin 27 that is cured with light such as ultraviolet light.

The elevator 25 is disposed on the housing 20. The elevator 25 is provided with the holder 26. The elevator 25 moves the holder 26 up and down by being controlled by the main controller 22. When the elevator 25 descends the holder 26, the holder 26 is immersed in the photocurable resin 27 in the resin vat 24.

In the housing 20, the first projector 21 and the second projector 22 are provided to project pictures on the bottom of the resin vat 24. The projectors 21 and 23 are both projection displays, and pictures projected by the projectors 21 and 23 are composed with each other and displayed on the bottom of the resin vat 24. The pictures projected by the projectors 21 and 22 are those (such as monochrome pictures, binary pictures, and grayscale pictures) represented with distribution of darkness and brightness of the light.

As shown in FIG. 2, the USB hub 40 includes downstream ports 41 to 43, an upstream port 45, and a hub controller 46. The upstream port 45 is connected to the host device 5 via the USB cable 4. The first and second downstream ports 41 and 43 are connected to the first and second projectors 21 and 23, respectively. The third downstream port 42 is connected to the main controller 22. The USB hub 40 manages signals that are sent and received by the host device to and from the projectors 21 and 23 and the main controller 22 in accordance with the USB specification.

The downstream ports 41 to 43 are assigned with port numbers having values which are different from each other. For example, the port numbers assigned to the first, second, and third downstream ports 41, 43, and 42 are "1," "3," and "2," respectively.

The first projector 21 includes a built-in USB controller. The first projector 21 receives, by the USB controller, a first picture signal that is transferred from the host device 5 via the USB hub 40 and projects a picture based on the first picture signal on the bottom of the resin vat 24. The second projector 23 also includes a built-in USB controller and the second projector 23 projects, on the bottom of the resin vat 24, a picture based on a second picture signal that is transferred from the host device 5.

The main controller 22 includes a microcomputer. The projectors 21 and 23 and the elevator 25 are controlled by the main controller 22. For this control, the host device 5 issues a command to the main controller 22 via the USB hub 40. In other words, the main controller 22 controls the projectors 21 and 23 and the elevator 25 in accordance with the command from the host device 5. With this, the modeling machine 2 performs modeling operations.

A modeling operation performed by the modeling machine 2 is as follows. First, as shown by a long dashed double-dotted line in FIG. 1, when the elevator 25 descends the holder 26, the holder 26 is immersed in the resin 27 in the resin vat 24. Then, the light sources of the projectors 21 and 23 are intermittently lit and the elevator 25 moves up the holder 26 intermittently by a certain distance. The timing at which the light sources of the projectors 21 and 23 are turned off synchronizes the timing at which the elevator 25 operates (the timing at which the holder 26 rises), and the timing at which the light sources of the projectors 21 and 23 are turned on synchronizes the timing at which the elevator 25 stops (the timing at which the upward movement of the holder 26 is discontinued). Thus, whenever the elevator 25 stops, each of the projectors 21 and 23 projects a picture based on a picture signal on the bottom of the resin vat 24 for a predetermined exposure time. Consequently, whenever the elevator 25 stops, a portion (exposed portion) of the resin 27 corresponding to a bright region in the picture is cured with light (e.g., ultraviolet light) at the bottom of the resin vat 24, and a two-dimensional slice modeled object (cured resin) having the same shape as that of the bright region in the picture is formed at the bottom of the resin vat 24. Every time the elevator 25 is activated, the slice modeled object(s) is/are moved up together with the holder 26. In this way, by alternating the projection/exposure using the projectors 21 and 23 and the upward movement of the holder 26, a three-dimensional modeled object grows downward beneath the holder 26.

As shown in FIG. 2, the USB hub 40 includes the hub controller 46. The hub controller 46 of the USB hub 40 includes identification information that has previously been stored therein with which the host device 5 (in particular, a USB host controller 54) recognizes the USB hub 40. The identification information includes a vendor ID (idVendor), a product ID (idProduct), and a serial number (idSerialNumber).

Figure 3:
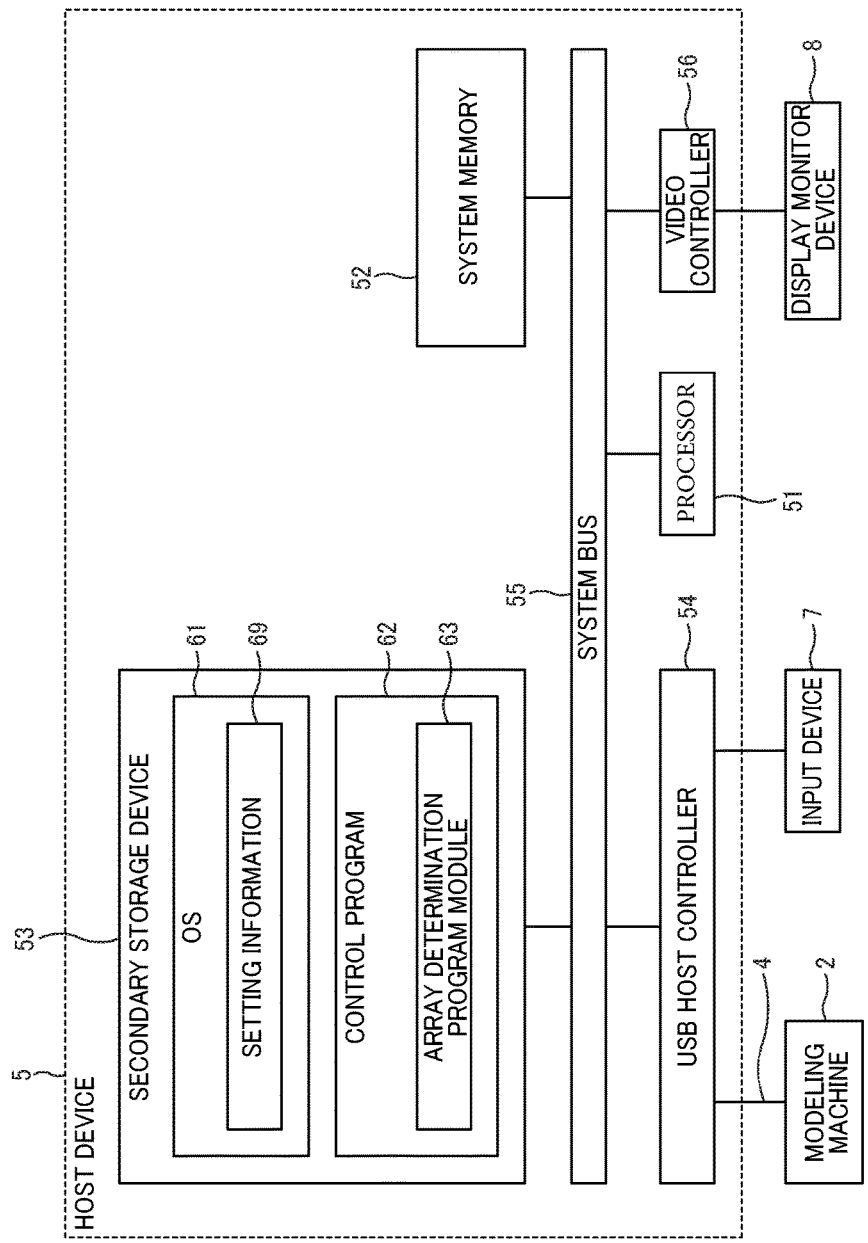
FIG. 3 is a block diagram of the host device.

When the host device 5 and the modeling machine 2 are connected to each other via the USB cable 4, an enumeration process complying with the USB standard is performed between the hub controller 46 of the USB hub 40 and the USB host controller 54 of the host device 5 (see, FIG. 3), and the host device 5 thus recognizes the USB hub 40 as a USB hub device (so-called plug and play function). During the enumeration process, the hub controller 46 of the USB hub 40 transfers, in response to a request from the USB host controller 54 of the host device 5, identification information (i.e., a vendor ID, a product ID, and a serial number) of the USB hub 40 to the USB host controller 54.

The USB controller of the first projector 21 includes identification information (the device descriptor) that has previously been stored therein with which the host device 5 recognizes the first projector 21. When the host device 5 and the modeling machine 2 are connected to each other via the USB cable 4, an enumeration process complying with the USB standard is performed between the USB controller of the first projector 21 and the USB host controller 54 of the host device 5, and the host device 5 thus recognizes the first projector 21 as a display device.

Similar to the first projector 21, the USB controller of the second projector 23 includes identification information (the device descriptor) of the second projector 23 that has previously been stored therein. Upon performing the enumeration process, the USB controller of the second projector 23 transfers the identification information of the second projector 23 to the USB host controller 54 of the host device 5. Since the projectors 21 and 23 are of the same type, the vendor and product IDs of the first projector 21 are identical to those of the second projectors 23, respectively. The serial number of the first projector 21 is, however, different from that of the second projector 23.

The main controller 22 includes a built-in USB controller. The USB controller of the main controller 22 includes identification information (i.e., a vendor ID, a product ID, and a serial number) that has previously been stored therein with which the host device 5 recognizes the modeling machine 2 (in particular, the main controller 22). When the host device 5 and the modeling machine 2 are connected to each other via the USB cable 4, the host device 5 recognizes the modeling machine 2 (in particular, the main controller 22) as a specified printer and a USB default printer through the enumeration process between the USB controller and the USB host controller 54. Upon performing this enumeration process, the USB controller transfers the identification information to the USB host controller 54.

The enumeration process between the USB hub 40 and the host device 5 is performed before the enumeration processes between the host device 5 and each of the projectors 21 and 23 and the main controller 22. The order of the enumeration processes for the projectors 21 and 23 and the main controller 22 is indeterminate and is the same as the order in which their connection with the host device 5 has been established via the USB hub 40.

The program required for the operations of the main controller 22 is stored on the memory 29. Furthermore, the memory 29 provides a work area for the main controller 22 when the main controller 22 performs its operation. The main controller 22 is connected to various devices 30. The device 30 may be, for example, an input device (e.g., a push button, a push key, and a switch) and/or an output device (e.g., a light-emitting element, a speaker, and a dot-matrix display).

The host device 5 preferably is a personal computer. The host device 5 includes a processor 51, a system memory 52, a secondary storage device 53, the USB host controller 54, a system bus 55, and a video controller 56. The processor 51, the system memory 52, the secondary storage device 53, the USB host controller 54, and the video controller 56 are connected to the system bus 55. The processor 51 includes a central processing unit (CPU). The system memory 52 includes a random access memory (RAM). The secondary storage device 53 includes a semiconductor memory device or a hard disk drive.

The video controller 56 is connected to a display monitor device 8. The video controller 56 generates a picture signal in accordance with a command from the processor 51 and supplies the picture signal to the display monitor device 8. With this, a picture based on the picture signal is displayed on the display monitor device 8.

The USB host controller 54 is connected to an input device (e.g., a keyboard or a pointing device) 7. The USB host controller 54 controls the transfer of signals between the input device 7 and the system bus 55. With this, a user can enter commands and information to the host device via the input device 7.

The USB host controller 54 controls, in accordance with a command from the processor 51, communication with the USB hub 40 in accordance with the USB specification. The USB host controller 54 also controls, in accordance with a command from the processor 51, communication with the projectors 21 and 23 and the main controller 22 via the USB hub 40.

The secondary storage device 53 stores an operating system (hereinafter, referred to as OS) 61 and a control program 62. The OS 61 may be, for example, Windows (registered trademark), Android (registered trademark), Linux (registered trademark), iOS (registered trademark) or macOS (registered trademark). The OS 61 is run by the processor 51 and runs on the host device 5 which is a computer. The system memory 52 provides a work area for the processor 51, and the OS 61 is loaded into the system memory 52 when activated.

The OS 61 has a configuration database 69. The configuration database 69 contains information on the configuration of the OS 61 and configuration of a device or devices recognized by the OS 61.

The OS 61 has plug and play function. The plug and play function of the OS 61 allows, when the modeling machine 2 is connected to the host device 5 initially, the host device 5 to detect and recognize the USB hub 40, the first projector 21, the second projector 23, and the modeling machine 2 (in particular, the main controller 22) and install drivers for them onto the OS 61. The OS 61 on the host device 5 recognizes first and second display devices which are abstract or virtual versions of the projectors 21 and 23, respectively, the specified printer and the USB default printer which are abstract or virtual versions of the modeling machine 2 (in particular, the main controller 22), and the USB hub device which is an abstract or virtual version of the USB hub 40.

The first and second display devices are also preferably USB devices on the OS 61. The USB default printer is also preferably a USB device on the OS 61.

Figure 4:
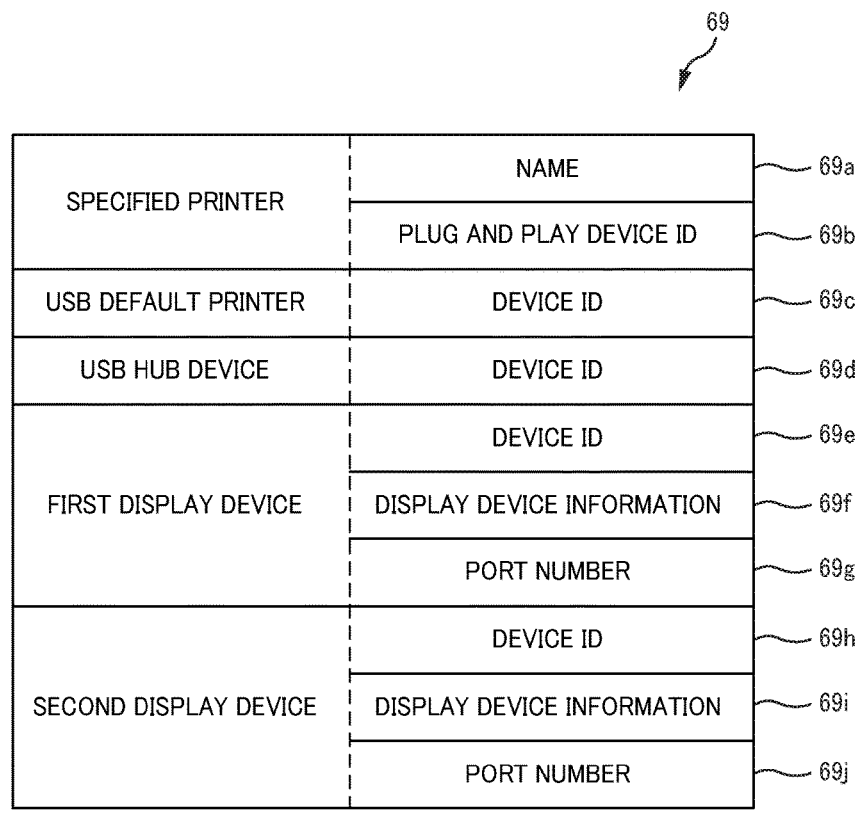
FIG. 4 is a diagrammatic representation of a configuration database.

The specified printer is assigned with a name and a unique plug and play device ID using the plug and play function of the OS 61. As shown in FIG. 4, name information 69a and a plug and play device ID 69b of the specified printer are registered in the configuration database 69.

The USB default printer is assigned with a unique device ID using the plug and play function of the OS 61. As shown in FIG. 4, a device ID 69c of the USB default printer is registered in the configuration database 69. The device ID 69c of the USB default printer is a combination of the vendor ID, the product ID, and the serial number which are transferred from the USB controller of the main controller 22 to the host device 5.

The USB hub device is assigned with a unique device ID using the plug and play function of the OS 61. As shown in FIG. 4, a device ID 69d of the USB hub device is registered in the configuration database 69. The device ID 69d of the USB hub device is a combination of the vendor ID, the product ID, and the serial number which are transferred from the hub controller 46 of the USB hub 40 to the host device 5.

The first display device is assigned with a unique device ID using the plug and play function of the OS 61. Likewise, the second display device is assigned with a unique device ID using the plug and play function of the OS 61. As shown in FIG. 4, device IDs 69e and 69h of the first and second display devices, respectively, are registered in the configuration database 69. The device ID of the first display device is a combination of the vendor ID, the product ID, and the serial number of the first projector 21 which are transferred from the USB hub controller 46 to the host device 5. The device ID of the second display device is a combination of the vendor ID, the product ID, and the serial number of the second projector 23 which are transferred from the USB hub controller 46 to the host device 5.

Furthermore, as shown in FIG. 4, display device information 69f of the first display device is correlated with the device ID 69e of the first display device and registered in the configuration database 69. A port number 69g of the first downstream port 41 that is connected to the first projector 21 is correlated with the device ID of the first display device using the plug and play function of the OS 61 and registered in the configuration database 69.

Likewise, display device information 69i of the second display device is correlated with the device ID 69h of the second display device and registered in the configuration database 69. A port number 69j of the second downstream port 43 that is connected to the second projector 23 is correlated with the device ID 69h of the second display device using the plug and play function of the OS 61 and registered in the configuration database 69.

The control program 62 is installed on the OS 61. When the processor 51 executes the control program 62 on the active OS 61, the modeling machine 2 is controlled by the host device 5. Under the control of the host device 5, the modeling machine 2 performs modeling operations as described above. Operations other than the modeling, such as trial runs, maintenance, and initialization, are also achieved by the processor 51 executing the control program 62.

Figure 5:
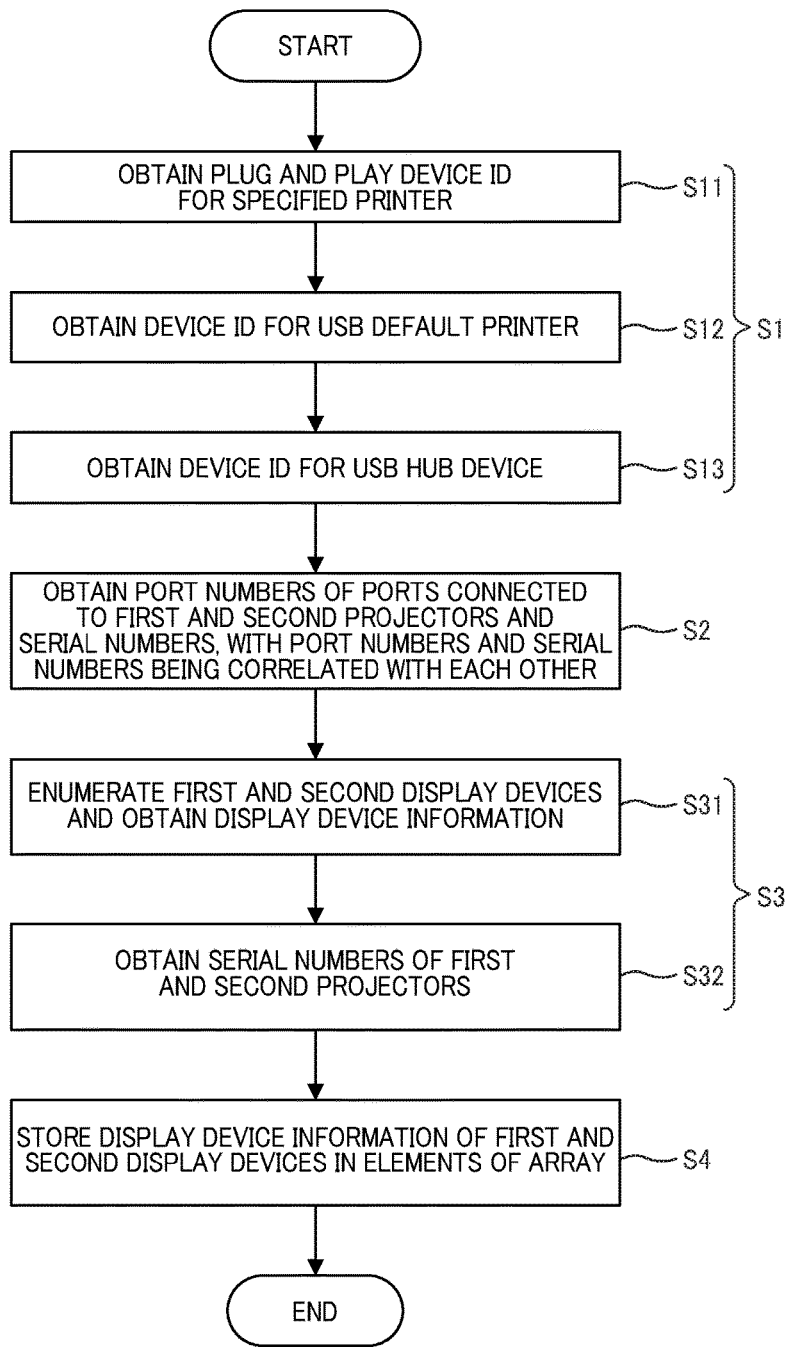
FIG. 5 is a flowchart showing a process flow in the host device.

The control program 62 includes an array determination program module 63 to identify the order in which the projectors 21 and 23 are arrayed in the control program 62. This module 63 is also a program. When a user issues a command to begin the control to the host device 5 using the input device 7, the processor 51 executes the control program 62. In this scenario, the array determination program module 63 is executed first by the processor 51. FIG. 5 is a flowchart illustrating a process flow in the processor 51 in accordance with the array determination program module 63.

(1) Step S1: Hub Identification Process

In step S1, the processor 51 obtains the device ID of the USB hub device to identify the USB hub device. Specific details are as follows.

First, the processor 51 queries the active OS 61 for the plug and play device ID that is assigned to the specified printer by designating the name of the specified printer and obtains the result as the plug and play device ID for the specified printer (step S11). In a case where the OS 61 is the Windows OS, the processor 51 executes functions (such as EnumPrinters( ) function, OpenPrinter( ) function, and GetPrinterDataEx( ) function) that are present in the Windows application program interface (API), which are implemented in the OS 61. The active OS 61 thus retrieves the configuration database 69 and the value of the plug and play device ID 69b of the specified printer is returned.

Next, the processor 51 queries the OS 61 for the device ID of the USB default printer by designating the plug and play device ID of the specified printer and obtains the query result as the device ID of the USB default printer (step S12). In a case where the OS 61 is the Windows OS, the processor 51 executes functions (such as CM_Get_Device_ID( ) function) that are present in the Windows API. The active OS 61 thus retrieves the configuration database 69 and the value of the device ID 69c of the USB default printer is returned.

Subsequently, the processor 51 queries the OS 61 for the device ID of the USB hub device by designating the device ID of the USB default printer and obtains the result as the device ID of the USB hub device (step S13). In a case where the OS 61 is the Windows OS, the processor 51 executes functions (such as CM_Get_Device_ID( ) function) that are present in the Windows API. The active OS 61 thus retrieves the configuration database 69 and the value of the device ID 69d of the USB hub device is returned. Using the aforementioned processes in steps S11 to S13, the USB hub 40 is identified from among the various USB hubs (including the root hub) that are implemented in the host device 5.

(2) Step S2: Correlation Process

In the subsequent step S2, the processor 51 designates the device ID of the USB hub device and issues a request for it to the OS 61 to obtain, for each of the display devices as the USB devices, the port numbers of the ports connected to the projectors 21 and 23 that are connected to the USB hub 40 and the serial numbers of the projectors 21 and 23, with the port numbers and the serial numbers being correlated with each other. In a case where the OS 61 is the Windows OS, the processor 51 executes functions (such as SetupDiGetDeviceRegistryProperty( ) function) that are present in the Windows API. The active OS 61 thus retrieves the configuration database 69, and the values of the port numbers 69g and 69j of the ports connected to the projectors 21 and 23 are returned. Furthermore, the processor 51 executes functions (such as CM_Get_Device_ID( ) function) that are present in the Windows API, the active OS 61 thus retrieves the configuration database 69 and the values of the device IDs 68e and 69h of the first and second display devices, respectively, as the USB devices are returned. Since each device ID which is a return value is a combination of a vendor ID, a product ID, and a serial number, the processor 51 extracts the serial number from the device ID.

FIG. 6 shows an example of the correlation between the port numbers and the serial numbers obtained by the processor 51. Since the first projector 21 is connected to the first downstream port 41, the port number (having the value of "1" in FIG. 6) that is assigned to the first downstream port 41 is correlated with the serial number (having the value of "0123456789ABCDEF" in FIG. 6) in the device ID of the first projector 21. Likewise, the port number (having the value of "3" in FIG. 6) that is assigned to the second downstream port 43 is correlated with the serial number (having the value of "0987654321FEDCBA" in FIG. 6) in the device ID of the second projector 23. The specific values of the port numbers and the serial numbers are not limited to those shown in FIG. 6.

(3) Step S3: Enumeration Process

In the subsequent step S3, the processor 51 obtains serial numbers and the display device information of the first and second display devices. Specific details are as follows.

The processor 51 causes the OS 61 to enumerate the first and second display devices that were recognized by the OS 61 to obtain their display device information (step S31). In a case where the OS 61 is the Windows OS, the processor 51 executes a function (such as EnumDisplayDevices( ) function) that is present in the Windows API. The active OS 61 thus retrieves the configuration database 69, resulting in a return of enumerated display device information.

The order in which the display devices are enumerated is identical to the order in which the projectors 21 and 23 were recognized by the OS 61 using the plug and play function when the modeling machine 2 is connected to the host device 5 initially. As shown in FIG. 7, if the OS 61 recognizes the first projector 21 first and then the second projector 23, using the plug and play function, the processor 51 obtains the display device information (having the value of "AAAAAA" in FIG. 7) of the first display device that was enumerated earlier and then obtains the display device information (having the value of "BBBBBB" in FIG. 7) of the second display device that was enumerated later. In contrast, as shown in FIG. 8, if the OS 61 recognizes the second projector 23 first and then the first projector 21, using the plug and play function, the processor 51 obtains the display device information (having the value of "BBBBBB" in FIG. 8) of the second display device that was enumerated earlier and then obtains the display device information (having the value of "AAAAAA" in FIG. 8) of the first display device that was enumerated later. FIGS. 7 and 8 are examples of enumerated display device information and the serial numbers.

Next, the processor 51 requests the OS 61 for the enumerated serial numbers of the first and second projectors 21 and 23 in the order in which the pieces of display device information were enumerated (step S32). In a case where the OS 61 is the Windows OS, the processor 51 executes functions (such as RegEnumValue( ) function) that are present in the Windows API. The active OS 61 thus retrieves the configuration database 69, and the device ID of each display device is returned. Since the device ID, which is a returned value, is a combination of the vendor ID, the product ID, and the serial number, the processor 51 extracts the serial number from the device ID.

As shown in FIG. 7, if the OS 61 recognizes the first projector 21 first and then the second projector 23, using the plug and play function, the processor 51 obtains the serial number (having the value of "0123456789ABCDEF" in FIG. 7) of the first projector 21 that was recognized earlier and then obtains the serial number (having the value of "0987654321FEDCBA" in FIG. 7) of the second projector 23 that was recognized later. In contrast, as shown in FIG. 8, if the OS 61 recognizes the second projector 23 first and then the first projector 21, using the plug and play function, the processor 51 obtains the serial number (having the value of "0987654321FEDCBA" in FIG. 8) of the second projector 23 that was recognized earlier and then obtains the serial number (having the value of "0123456789ABCDEF" in FIG. 8) of the first projector 21 that was recognized later.

(4) Step S4

In the subsequent step S4, the processor 51 collates the result of the correlation in step S2 and the result of the enumeration in step S3, and stores the display device information in the elements of an array in an order identical to the numerical order of the port numbers (specifically, the ascending order) in the correlation in step S2.

Specifically, the processor 51 collates the serial number correlated with the smaller port number obtained by the correlation process in step S2 to the serial numbers obtained by the enumeration process in step S3. With this, the processor 51 retrieves, from the serial numbers obtained by the enumeration process in step S3, the serial number that is identical to the serial number correlated with the smaller port number by the correlation process in step S2. The processor 51 then stores, in the first element of the array, the display device information that lies at the same number from the top of the enumerated result as the number of the retrieved serial number, among the display device information obtained by the enumeration process in step S3.

Next, the processor 51 collates the serial number correlated with the larger port number obtained by the correlation process in step S2 to the serial numbers obtained by the enumeration process in step S3. With this, the processor 51 retrieves, from the serial numbers obtained by the enumeration process in step S3, the serial number that is identical to the serial number correlated with the larger port number by the correlation process in step S2. The processor 51 then stores, in the second element of the array, the display device information that lies at the same number from the top of the enumerated result as the number of the retrieved serial number, among the display device information obtained by the enumeration process in step S3.

When the port numbers and the serial numbers obtained in step S2 have the values as shown in FIG. 6, and the display device information and the serial numbers obtained in step S4 have the values as shown in FIGS. 7 and 8, an array generated in step S4 is as shown in FIG. 9. As shown in FIGS. 6 to 9, regardless of the order in which the display device information of the first and second display devices are enumerated, the display device information of the first display device is stored in the first element of the array "Array[ ]" and the device information of the second display device is stored in the second element of the array "Array[ ]."

This array is an array that was declared in the control program 62 to determine the order in which the first and second display devices are arrayed in the control program 62. When the control program 62 with the declaration of the array is executed by the processor 51, the first projector 21 and the second projector 23 are controlled in the correct order. In other words, the processor 51 always supplies the first and second picture signals to their correct, intended destinations, i.e., the first and second projectors 21 and 23, respectively.

As described above, by collating the correlation in step S2 and the enumeration in step S3, the display device information of the first and second display devices are stored in the elements of the array in the order identical to the order of the port numbers in the correlation in step S2. Accordingly, it is possible to make the order in which the first and second display devices are arrayed in the control program 62 correct. This means that the first picture signal that should be supplied to the first projector 21 is correctly supplied to the first projector 21 without fail, and the second picture signal that should be supplied to the second projector 23 is correctly supplied to the second projector 23 without fail.

Furthermore, using the processes in steps S11 to S13, the USB hub 40 can be identified from among the various USB hubs (including the root hub) that are implemented in the host device 5.

In the aforementioned preferred embodiments, what is controlled by the host device 5 is the modeling machine 2. The built-in displays of the machine are projection displays 21 and 23, and the picture signals are supplied from the host device 5 to the displays 21 and 23.

However, what is controlled by the host device 5 is not limited to the modeling machine as long as it is a hub-connected compound device including two displays (such as liquid-crystal displays), a USB hub, and a main controller. In such scenarios, the control program 62 is designed so that the device or machine is controlled using the control program 62. The details of the array determination program module 63 included in the modified control program 62 are identical to those described above.

Furthermore, in the aforementioned preferred embodiments, the port number of the first downstream port 41 to which the first projector 21 is connected is smaller than the port number of the second downstream port 43 to which the second projector 23 is connected. However, the port number of the first downstream port 41 to which the first projector 21 is connected may be larger than the port number of the second downstream port 43 to which the second projector 23 is connected. In this scenario, in the subsequent step S4, the processor 51 collates the result of the correlation in step S2 and the result of the enumeration in step S3, and stores the display device information in the elements of the array in the order identical to the descending order of the port number in the correlation in step S2.

In addition to the first and second projectors 21 and 23, another projector may be connected to the USB hub 40.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A non-transitory computer-readable medium storing a program that causes a computer to execute processes, the computer supplying, via a hub, different picture signals to first and second displays connected to first and second downstream ports, respectively, of the hub, the processes including:
    a correlation process to obtain, for each of first and second display devices, port numbers of ports connected to the first and second displays and serial numbers of the first and second displays, with the port numbers correlated with the serial numbers, each of the first and second display devices being an abstract or virtual version of the first and second displays, respectively;
    an enumeration process to enumerate the first and the second display devices, obtain display device information of each of the first and second display devices in accordance with an order in which the first and second display devices were enumerated, and obtain the serial numbers of the first and second displays in accordance with the order in which the first and second display devices were enumerated; and
    an array generation process to collate the serial numbers obtained by the correlation process to the serial numbers obtained by the enumeration process and storing, in array elements, the display device information in an order identical to an order of the collated serial numbers, based on a numerical order of the port numbers obtained by the correlation process.

2. The non-transitory computer-readable medium according to claim 1, wherein
    the program further causes the computer to execute an identification process to identify the hub by obtaining a device ID for the hub;
    in the correlation process, the port numbers and the serial numbers are obtained, with the port numbers correlated with the serial numbers, by sending a query to an operating system of the computer using the device ID obtained in the identification process.

3. A host device supplying, via a hub, different picture signals to first and second displays connected to first and second downstream ports, respectively, of the hub, the host device being configured or programmed to execute processes including:
    a correlation process to obtain, for each of first and second display devices, port numbers of ports connected to the first and second displays and serial numbers of the first and second displays, with the port numbers correlated with the serial numbers, each of the first and second display devices being an abstract or virtual version of the first and second displays, respectively;
    an enumeration process to enumerate the first and the second display devices, obtain display device information of each of the first and second display devices in accordance with an order in which the first and second display devices were enumerated, and obtain the serial numbers of the first and second displays in accordance with the order in which the first and second display devices were enumerated; and
    an array generation process to collate the serial numbers obtained by the correlation process to the serial numbers obtained by the enumeration process and storing, in array elements, the display device information in an order identical to an order of the collated serial numbers, based on a numerical order of the port numbers obtained by the correlation process.

4. An array determination method performed by a host device to supply via a hub, different picture signals to first and second displays connected to first and second downstream ports, respectively, of the hub, the method including:
    a correlation process to obtain, for each of first and second display devices, port numbers of ports connected to the first and second displays and serial numbers of the first and second displays, with the port numbers correlated with the serial numbers, each of the first and second display devices being an abstract or virtual version of the first and second displays, respectively;
    an enumeration process to enumerate the first and the second display devices, obtain display device information of each of the first and second display devices in accordance with an order in which the first and second display devices were enumerated, and obtain the serial numbers of the first and second displays in accordance with the order in which the first and second display devices were enumerated; and
    an array generation process to collate the serial numbers obtained by the correlation process to the serial numbers obtained by the enumeration process and storing, in array elements, the display device information in an order identical to an order of the collated serial numbers, based on a numerical order of the port numbers obtained by the correlation process.

* * * * *